March 23, 1948.  C. F. MOONEY  2,438,346
SAFETY DEVICE FOR TRAILERS
Filed Nov. 30, 1945  3 Sheets-Sheet 1
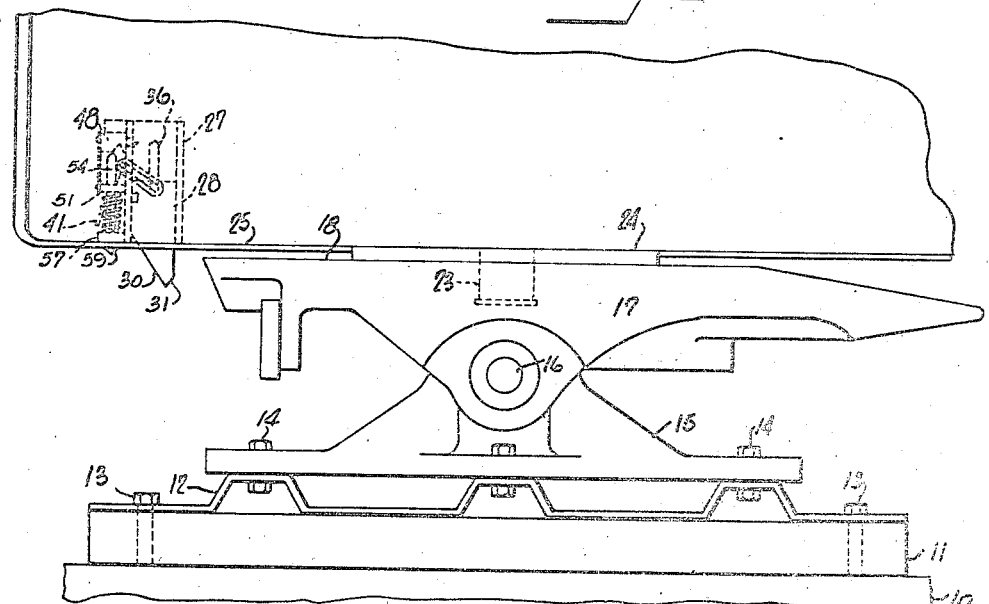
Inventor,
CHARLES F. MOONEY
By
Attorney March 23, 1948.  C. F. MOONEY  2,438,346
SAFETY DEVICE FOR TRAILERS
Filed Nov. 30, 1945  3 Sheets-Sheet 2

CHARLES F. MOONEY,
Inventor.

By Paul S Eaton
Attorney

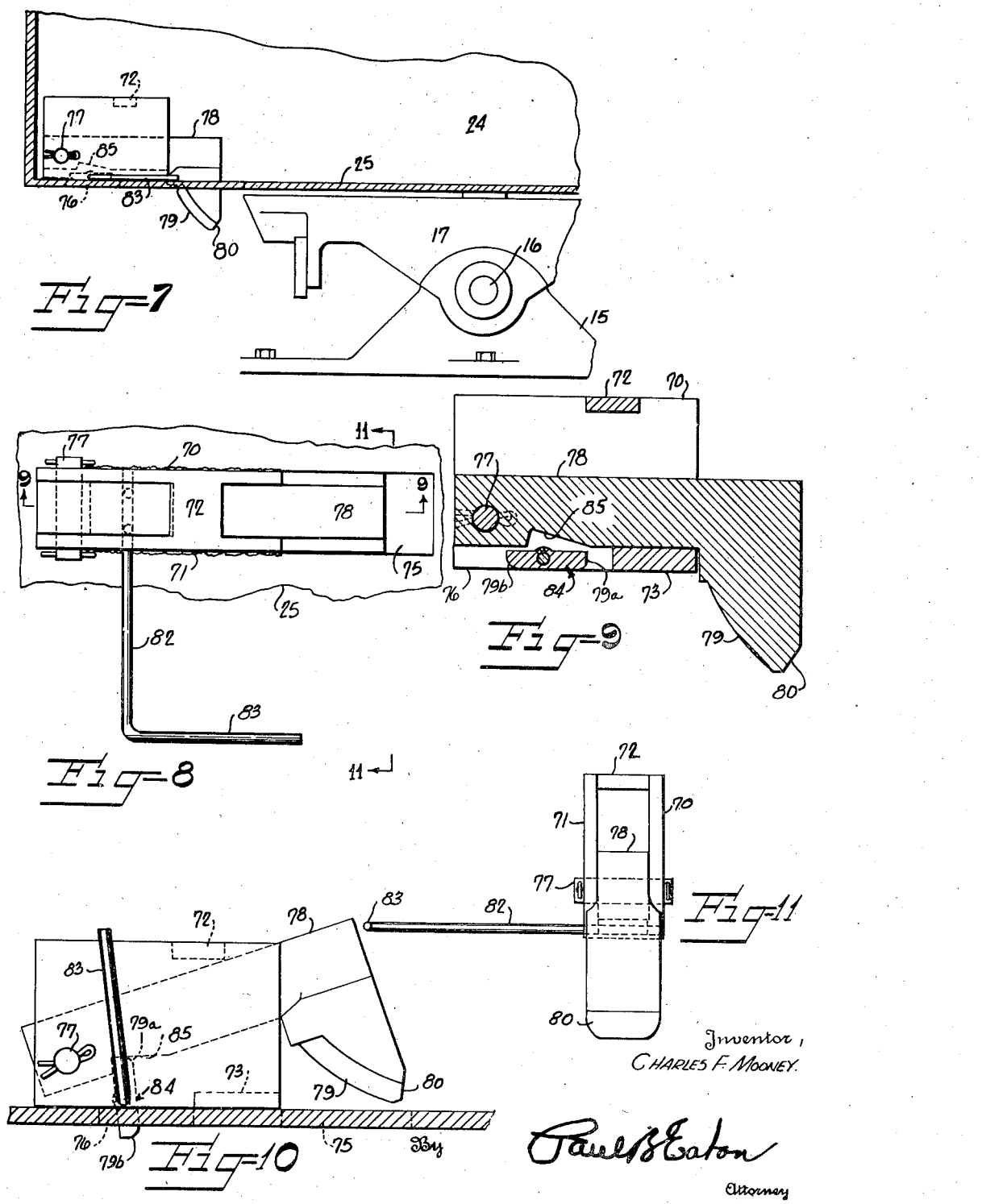

Patented Mar. 23, 1948

2,438,346

UNITED STATES PATENT OFFICE 2,438,346

SAFETY DEVICE FOR TRAILERS

Charles F. Mooney, Charlotte, N. C.

Application November 30, 1945, Serial No. 632,009

7 Claims. (Cl. 280—33.05)

This invention relates to a safety device for the connection between a tractor and a trailer or a semi-trailer. A semi-trailer has rear wheels which contact the ground and has suitable supporting means such as retractable wheels or other props to be let down to hold the front end of the trailer in elevated position when it is disconnected from the tractor. The tractor has what is called a fifth wheel, and the trailer has a downwardly projecting pin which is adapted to slide into a slot in the fifth wheel and be automatically locked in position when the tractor is backed underneath the front end of the trailer. It often happens that the tractor is backed in with too much force and a rebound occurs which results in the connecting pin on the trailer not being properly locked in the fifth wheel mechanism and when the tractor starts moving forwardly, the trailer is not pulled by the tractor and the trailer slides off of the fifth wheel as the tractor is pulled from beneath the trailer resulting in the front end of the trailer which is usually heavily loaded falling onto the ground or pavement and doing material and substantial damage to the trailer.

It is an object of this invention to provide safety means which will prevent the front end of the trailer from disengaging itself from the fifth wheel when failure of the locking mechanism occurs by providing a latch which is normally disposed in a downward position in front of the fifth wheel so that if the downwardly projecting pin on the trailer is not locked by the locking mechanism in the fifth wheel, then this latch will engage the front end of the fifth wheel mechanism and prevent the separation of the tractor and trailer.

It is another object of this invention to provide a safety means for trailers whereby a dog is provided on the trailer which has a sloping surface engageable by the fifth wheel of a tractor when the tractor is backed beneath the trailer which raises the dog and when the tractor has about completed its backing operation, the dog will fall in front of the fifth wheel. This prevents separation of the tractor from the trailer until the dog is manually raised. Associated with the dog are means engageable with the upper surface of the fifth wheel of the tractor as it is pulled from beneath the trailer for automatically releasing the dog so that when the fifth wheel has been completely removed from beneath the trailer, the dog which has been released will automatically fall downwardly into a position ready to be raised by the fifth wheel of a tractor to be thereafter coupled thereto.

Some of the objects of the invention having been stated, other objects will appear as the description proceeds when taken in connection with the accompanying drawings, in which—

Figure 1 is a side elevation showing the front end of a trailer and the rear end, or fifth wheel portion, of a tractor;

Figure 2 is a top plan view of a portion of the fifth wheel of a tractor, and showing a portion of the front end of the trailer with the invention attached thereto;

Figure 7 is a view similar to Figure 1 but showing a modified form of the invention;

Figure 8 is a top plan view of the apparatus shown in Figure 7;

Figure 9 is a longitudinal sectional view, taken along the line 9—9 in Figure 8;

Figure 10 is a view similar to Figure 1 and showing the dog in raised position;

Figure 11 is an elevation looking from along the line 11—11 in Figure 8.

Figure 3:
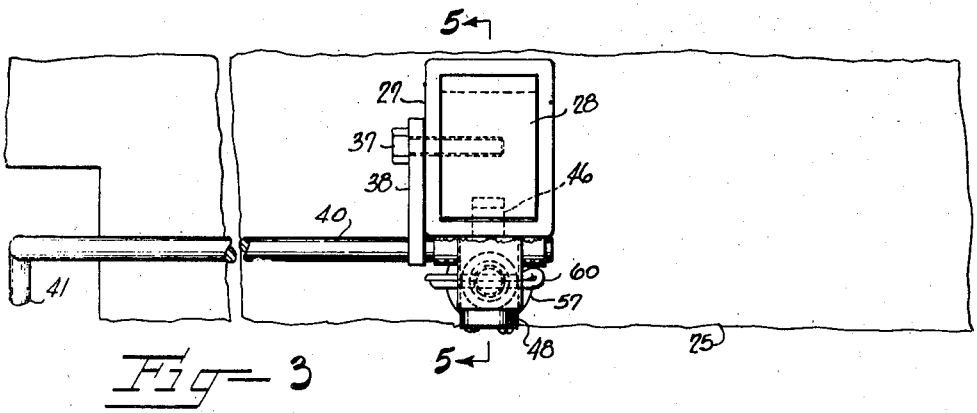
Figure 3 is a top plan view of the front end of a trailer showing the invention attached thereto and on a larger-scale than shown in Figure 2.

Referring more specifically to the drawings, the numeral 10 indicates a portion of a tractor having on each side thereof a pair of rails 11 having a flange portion 12, the rails 11 being disposed on each side of the framework of the tractor, and each of the rails is secured to the framework of the trailer by any suitable means such as bolts 13.

Bolted on the rails 11 and spanning the distance there-between, by any suitable means such as bolts 14, is a casting 15 having a transversely disposed shaft 16 pivotally mounted therein.

Fixedly secured on the shaft 16 is a fifth wheel 17 which has a flat upper surface 18 and has a slot 19 therein which is divergent as at 20 at its rear end for receiving a coupling pin 23 secured to and projecting downwardly from a semi-trailer 24.

The semi-trailer 24 is of conventional structure and in one form, as shown in Figures 1 and 2, has a bottom comprising a steel plate 25. There is an opening cut in this bottom 25 and a rectangular tubular member 27 is welded in this opening and rises upwardly inside the front portion of the trailer enclosure. This square tubular member 27 has a vertically slidable dog 28 mounted therein whose lower front end is beveled as at 30 and whose rear end is slightly beveled as at 31. The beveled portion 30 is adapted to ride up the slot 19 and over the surface of the fifth wheel member 18 and drop down in front of the fifth wheel member 17 to the position shown in Figure 1, when the tractor is backed beneath the front end of the trailer. The upper surface 18 of the fifth wheel 17 usually has one or more grease grooves 35 therein. Therefore, the rear lower edge of dog 30 is beveled as at 31 so that it will ride over these grooves when the tractor is being uncoupled from the semi-trailer body as will be later explained.

The tubular member 27 has a slot 36 in one side thereof and the dog 28 has a bolt 37 threadably secured therein and projecting through the slot 36. This bolt 37 is slidably mounted in a slot 38 in an arm 39 integral with a rod 40 having a handle portion 41 and rotatably mounted in a bearing 42 mounted on the front side wall of tubular member 27. By means of rotating rod 40 the dog 27 can be raised upwardly.

Figures 4, 5:
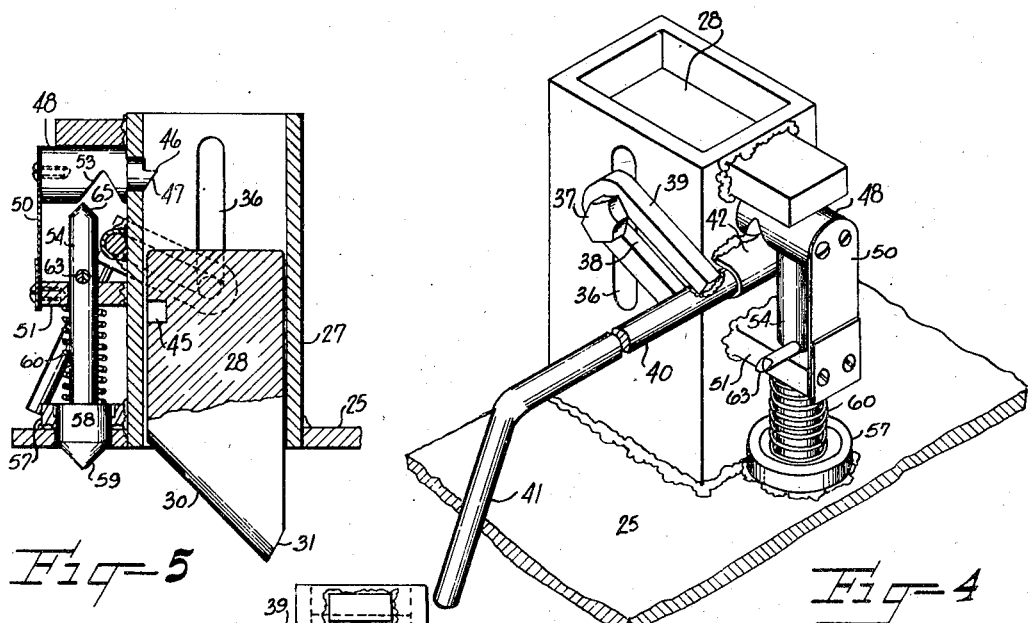
Figure 4 is an isometric view of the apparatus, showing it in position on the floor of the trailer.
Figure 5 is a vertical sectional view, taken along the line 5—5 in Figure 3.
Figure 6:
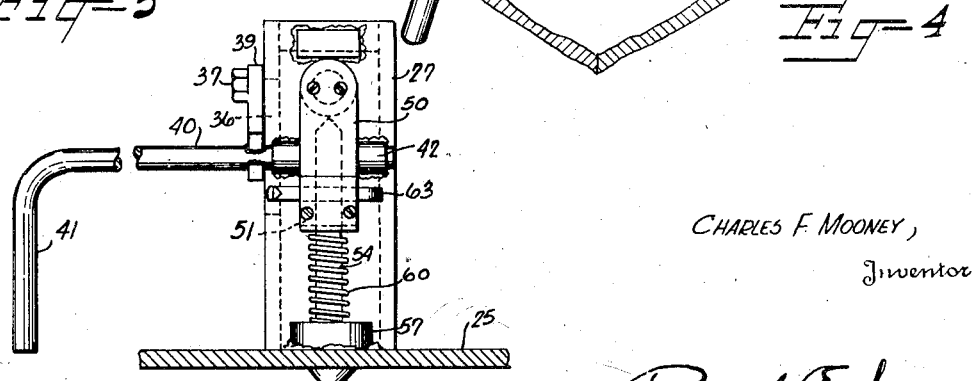
Figure 6 is a front elevation of the apparatus.

The dog 28 also has in its front side a cavity 45 which is adapted to be engaged by a projection 46 having a cam surface 47 on its lower side. The projection 46 is integral with an enlarged portion 48 disposed on the exterior of the tubular member 27 and a leaf spring 50 is secured at its upper end to the enlarged portion 48 and the lower end of this leaf spring is secured to a projection 51 projecting forwardly from the front of the side wall of the tubular member 27. This spring normally holds the portion 48, 46, and 47 in the position shown in Figure 5. The portion 48 has an inverted V-shaped cavity 53 therein and there is a plunger 54 slidably mounted in projection 51 and in a projection 57 extending forwardly of the front side wall. This lower end of member 54 is enlarged as at 58 and has a conical pointed lower end 59. A compression spring 60 is disposed between the projection 51 and the enlarged portion 58 which tends to hold the member 54 in lowered position as shown in Figure 5. This member 54 has a pin 63 therethrough which limits the downwardly movement of member 54. The reason for the pointed portion 59 is that in riding over the fifth wheel the grooves 35 must be passed over and the pointed or cam surface portion 59 is provided.

When rod 40 is turned by handle 41 to raise the dog 28, its front or left hand portion in Figure 5 will engage cam face 47 and force the member 48 against the tension of spring 50 to the left in Figure 5 until the cavity 45 coincides with the shoulder 46 which will enter cavity 45 and hold the dog 28 in elevated position, which will remove the lower end portion 31 from the path of the fifth wheel as the tractor is moved forwardly from beneath the trailer. During this operation the dog 59 will engage the upper surface 18 of the fifth wheel and the member 54 will be pushed upwardly and its upper pointed portion 65 will ride upwardly in notch 53 and this will move the member 48 to the left in Figure 5 and will release dog 28 so that it will automatically fall downwardly and ride on the fifth wheel and will fall to the position shown in Figure 5 when the fifth wheel 17 has passed forwardly from beneath the trailer.

It will be noted in Figure 5 that the distance from the top of the sloping surface 30 to the top wall of cavity 45 is greater than the distance from the lower end of the sloping surface 31 to the bottom of the plate 25. With the parts in the position shown in Figures 1 and 5, a tractor can be backed beneath the trailer. The sloping surfaces 20 or the end wall of slot 19 will engage the sloping surface 30 and raise the dog 28 to a point where its lower end will be flush with the lower surface of the plate 25. This, however, will not raise dog 28 high enough for its cavity 45 to coincide with the latch 48 and therefore the dog will not be latched in raised position, but will fall in front of the fifth wheel just as complete coupling takes place. Now, when it is desired to uncouple the tractor from the trailer, an operator turns handle 83 to raise dog 28 to a higher elevation than it would be raised by riding over the fifth wheel. This will raise the dog 28 high enough to cause latch 48 to enter cavity 45 and latch it in uppermost position. As the tractor is pulled from beneath the trailer, the dog 28 will first appear above the front edge of the fifth wheel, then the front edge of the fifth wheel will strike the beveled surface 59 of the pin 54 which will raise the pin 54 to cause its upper end 65 to enter the notch 53 and move the dog 48 to the left in Figure 5 out of cavity 45 and the lower end of the dog 28 will fall downwardly and ride on the fifth wheel and fall to the position shown in Figures 1 and 5 after the fifth wheel has passed beneath the same and thus be ready for another tractor to be backed therebeneath for another coupling operation.

In Figures 7 to 11, inclusive, I have shown a modified form of the invention in which like reference characters will apply to similar parts. In this form of the invention, I provide a pair of side plates 70 and 71 which are bridged at the top by a member 72 and at the bottom by a member 73. These side plates 70 and 71 are mounted on top of the bottom 25 of the semi-trailer body and are secured thereto by any suitable means such as by welding. A pair of openings 75 and 76 are provided in the bottom 25. Pivotally mounted on a bolt 77 is a dog 78 having a rearwardly sloping portion 74 and a smaller forwardly sloping portion 80 on its lower end. When in lowered position, it is adapted to rest on the lower bridge member 73. Pivotally mounted in the side plates 70 and 71 and bridging the distance therebetween is a rod 82 having a crank portion 83 and having a member 84 fixedly secured thereon. The dog 78 has a cavity 85 in its lower surface into which leg 79a is adapted to project when the dog is raised upwardly to the position shown in Figure 10, the lower leg 79b is adapted to project downwardly. When it is desired to detach the trailer from a tractor, the trailer being equipped with the form of the invention shown in Figures 7 to 11, inclusive, the rod 82 is moved from the position shown in Figures 8 and 9 to the position shown in Figure 10. This will cause the leg 79a of the member 84 to raise the member 78. As the tractor is pulled from beneath the front end of the trailer, the front end of the fifth wheel 17 will strike the leg 79b and move member 84 to the position shown in Figures 7 and 9 and the lower end of dog 78 will fall downwardly and it will ride over the upper surface 18 of the fifth wheel 17 and fall downwardly ready for the next coupling operation. When a coupling operation is to take place, the tractor will be backed beneath the front end of the trailer and the front surface 79 of the dog 78 will engage surfaces 20 or the base of slot 19 and will be raised to ride over surface 18 of the fifth wheel and fall in front of the fifth wheel to the position shown in Figure 7.

In the drawings and specification there has been set forth a preferred embodiment of the invention, and although specific terms are employed, they are used in a generic and descriptive sense only, and not for purposes of limitation, the scope of the invention being defined in the claims.

I claim:

1. In a tractor and trailer, the tractor having a fifth wheel on which the front end of a trailer is adapted to rest, a downwardly projecting dog mounted on the front portion of the trailer and having a substantially vertical rear surface and a downwardly and rearwardly sloping front surface and having its lower end normally occupying a position in front of the fifth wheel of the trailer when the tractor and trailer are coupled together to prevent disengagement of the trailer from the fifth wheel, means for moving the dog upwardly to remove the lower end thereof above the path traveled by the fifth wheel, means for latching the dog in raised position, and means engageable by the fifth wheel for moving the latching means to releasing position to allow the dog to fall downwardly when the tractor and the trailer are separated.

2. In a tractor having a fifth wheel on the rear end thereof and provided with means for receiving a downwardly projecting pin mounted on the front end of a trailer, a downwardly projecting dog mounted on the trailer and whose lower end is normally disposed in front of the fifth wheel when the tractor and trailer are coupled together to prevent the tractor and its fifth wheel from being pulled from beneath the front end of the trailer, means for moving the lower end of the dog upwardly out of the path traveled by the fifth wheel when the fifth wheel moves forwardly relative to the trailer, means for latching the latch in raised position, and automatically operated means engageable by the fifth wheel of the tractor for releasing the latching means and allowing the dog to fall behind the fifth wheel when the tractor and trailer are uncoupled.

3. In a tractor having a fifth wheel on the rear end thereof and provided with means for receiving a downwardly projecting pin mounted on the front end of a trailer, a downwardly projecting dog mounted on the trailer and whose lower end is normally disposed in front of the fifth wheel when the tractor and trailer are coupled together to prevent the tractor and its fifth wheel from being pulled from beneath the front of the trailer, manually operated means connected to the dog for raising the same upwardly out of the path of the fifth wheel when it is desired to disconnect the tractor and the trailer, and means automatically operable by engagement by the fifth wheel of the tractor when the fifth wheel of the tractor is being moved forwardly from beneath the trailer for releasing the manually operated means to allow the dog to fall downwardly onto the fifth wheel and behind the fifth wheel when the fifth wheel is entirely removed from beneath the dog.

4. In a tractor and trailer combination, the tractor being equipped with a fifth wheel having a rearwardly opening slot therein into which a downwardly projecting pin on the trailer is adapted to move when the tractor is backed beneath the trailer, a downwardly projecting dog mounted on the trailer and adapted to project downwardly in front of the fifth wheel when the tractor and trailer are coupled together to prevent movement of the fifth wheel forwardly from beneath the trailer, the front portion of the lower end of the dog being sloped downwardly and rearwardly to allow it to be raised by the fifth wheel when the tractor is backed beneath the trailer, the dog being urged downwardly by gravity to a position in front of the fifth wheel, means for raising the dog upwardly, means for latching the dog in raised position, means engageable by the fifth wheel for releasing the latching means to allow the dog to fall behind the fifth wheel of the trailer when the fifth wheel passes forwardly from beneath the dog.

5. In a tractor and trailer having a fifth wheel and having a downwardly projecting pin adapted to fit into the fifth wheel, a downwardly projecting dog mounted on the front portion of the trailer and normally occupying a position in front of the fifth wheel of the trailer to prevent disengagement of the trailer from the fifth wheel, the lower end of the dog being sloped downwardly and rearwardly to cause it to ride on the upper surface of the fifth wheel when the tractor is backed beneath the front end of the trailer, means for latching the dog in raised position, means engageable by the fifth wheel as the tractor is moved forwardly from beneath the trailer for releasing the latching means and allowing the dog to fall downwardly onto the fifth wheel and to fall downwardly in the rear of the fifth wheel when the tractor and trailer are uncoupled.

6. In a tractor having a fifth wheel on the rear end thereof, a downwardly projecting dog mounted on the trailer and whose lower end is normally disposed in front of the fifth wheel to prevent the tractor and its fifth wheel from being pulled from beneath the front end of the trailer, the lower end of the latch being sloped downwardly and rearwardly to cause it to ride on the upper surface of the fifth wheel and occupy a position in front of the fifth wheel when the tractor is backed beneath the front end of the trailer, means for latching the dog in upwardly raised position, means engageable by contact with the upper surface of the fifth wheel as it is being moved forwardly from beneath the trailer for releasing the latching means and allowing the latch to fall by gravity in the rear of the fifth wheel when the tractor and trailer are separated.

7. In a tractor and trailer, the tractor having a fifth wheel onto which the front end of a trailer is adapted to be connected, a tubular member mounted on the floor of the trailer and the floor of the trailer being open below the tubular member, a vertically slidable dog mounted in the tubular member and adapted to fall by gravity in front of the fifth wheel when the tractor and trailer are coupled together, means for raising the dog upwardly out of the path of the fifth wheel, means for latching the dog in raised position, a downwardly projecting member associated with the latching means and projecting through the floor of the trailer and engageable by the fifth wheel as the tractor is moved forwardly from beneath the trailer for releasing the means for latching the dog in raised position and allowing the dog to fall onto the fifth wheel and in the rear of the fifth wheel when the tractor and trailer are uncoupled.

CHARLES F. MOONEY.

REFERENCES CITED

The following references are of record in the file of this patent:

UNITED STATES PATENTS

| Number | Name | Date |
| --- | --- | --- |
| 2,381,305 | Mooney | Aug. 7, 1945 |